(12) United States Patent
Qi et al.

(10) Patent No.: US 10,367,761 B2
(45) Date of Patent: Jul. 30, 2019

(54) COORDINATED CHANNEL SWITCH TIMING AND TRANSMISSIONS IN NEIGHBORHOOD AWARENESS NETWORKS

(71) Applicant: Intel IP Corporation, Santa Clara, CA (US)

(72) Inventors: Emily H. Qi, Gig Harbor, WA (US); Po-Kai Huang, Santa Clara, CA (US); Elad Oren, Tel Aviv (IL)

(73) Assignee: Intel IP Corporation, Santa Clara, CA (US)

( * ) Notice: Subject to any disclaimer, the term of this patent is extended or adjusted under 35 U.S.C. 154(b) by 108 days.

(21) Appl. No.: 15/392,771

(22) Filed: Dec. 28, 2016

(65) Prior Publication Data

US 2017/0310610 A1    Oct. 26, 2017

Related U.S. Application Data

(60) Provisional application No. 62/327,010, filed on Apr. 25, 2016.

(51) Int. Cl.
| | |
|---|---|
| *H04W 74/08* | (2009.01) |
| *H04L 12/931* | (2013.01) |
| *H04L 12/911* | (2013.01) |
| *H04W 36/06* | (2009.01) |
| *H04W 76/23* | (2018.01) |
| *H04W 8/00* | (2009.01) |
| *H04W 84/18* | (2009.01) |

(52) U.S. Cl.
CPC .......... *H04L 49/355* (2013.01); *H04L 47/826* (2013.01); *H04W 8/005* (2013.01); *H04W 36/06* (2013.01); *H04W 76/23* (2018.02); *H04W 84/18* (2013.01)

(58) Field of Classification Search
CPC .............. H04W 74/00; H04W 74/002; H04W 74/0866; H04W 76/00; H04W 76/23; H04W 8/005; H04L 49/355
See application file for complete search history.

(56) References Cited

U.S. PATENT DOCUMENTS

| | | | | |
|---|---|---|---|---|
| 2012/0314614 A1* | 12/2012 | Wentink | ................ | H04W 76/10 370/252 |
| 2015/0245317 A1* | 8/2015 | Aoki | ..................... | H04W 72/02 370/329 |
| 2016/0007247 A1* | 1/2016 | Lee | ................... | H04W 36/0066 370/331 |

* cited by examiner

*Primary Examiner* — Un C Cho
*Assistant Examiner* — Kenan Cehic
(74) *Attorney, Agent, or Firm* — Eversheds Sutherland (US) LLP (57) ABSTRACT

This disclosure describes methods, devices, and systems related to coordinating channel switch times and specifying device operation (for example, transmitting device operation) to ensure data reception by one or more devices (for example, receiving devices). A device may receive a data path setup request frame from a second device. The device may cause to send a service a data path setup response frame. The device may cause to establish a communication with the second device on a first channel. The device may cause to establish a communication with the second device on a second channel at a first time. The device may cause to wait, by the device, at least for a duration specified by a channel switch time (CST) parameter. The device may cause to send device data to the second device over the first channel or the second channel based at least in part on the CST parameter.

14 Claims, 7 Drawing Sheets

COORDINATED CHANNEL SWITCH TIMING AND TRANSMISSIONS IN NEIGHBORHOOD AWARENESS NETWORKS

CROSS-REFERENCE TO RELATED APPLICATIONS

This application claims the benefit of U.S. Provisional Application Ser. No. 62/327,010, filed on Apr. 25, 2016, the disclosure of which is incorporated herein by reference as if set forth in full.

TECHNICAL FIELD

This disclosure generally relates to systems and methods for wireless communications and, more particularly, systems and methods to coordinated channel transmissions for wireless communication, e.g. in Wireless Local Area Networks (WLANs), and/or Wi-Fi.

BACKGROUND

Neighbor Awareness Networking (NAN) may refer to a specification for Wi-Fi for device and/or service discovery and peer to peer communication. NAN may describe the formation of a cluster of devices (referred to as a NAN cluster) for devices in physical proximity to one another.

DETAILED DESCRIPTION

Example embodiments described herein provide certain systems, methods, and devices, for providing signaling information to Wi-Fi devices in various Wi-Fi networks, including, but not limited to, Neighborhood Awareness Networks (NAN).

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Devices in the same NAN cluster may achieve low power operation, for example, by following the same awake-time schedule. Moreover, the devices may transmit NAN service discovery frames in discovery windows (DWs) to subscribe to and/or announce the services that the devices are interested in receiving from other NAN devices in the cluster. Additionally or alternatively, the devices may announce the services that the devices are providing to other devices in the cluster.

In the IEEE 802.11 specification for wireless devices, a channel switch time is transmitted between devices in a channel switch announcement frame so that the devices know when to switch between channels. However, a NAN device will not send a channel switch announcement frame when switching channels. Instead, NAN devices switch channels based on a negotiated channel/timeslot schedule. The negotiated channel/timeslot schedules however, are not always the same between devices resulting in less than optimum channel switching and missed data traffic by receiving devices.

Example embodiments of the present disclosure relate to methods, devices, and systems related to coordinating channel switch times and specifying device operation (for example, transmitting device operation) to ensure data reception by one or more devices (for example, receiving devices).

In one embodiment, a new attribute (e.g., a channel switch time device capability attribute) may be introduced to define the timing of channel switch times. The attribute may include a channel switch time (CST) parameter that indicates an interval (e.g., in microseconds) that a device takes to switch from one channel to another channel.

In one embodiment, a sending device may transmit the attribute when it is performing a service discovery to discover one or more services that may be offered by a receiving device.

In another embodiment, the sending device may transmit the attribute in a data path setup request and/or data setup response frame that may be communicated between the sending and one or more NAN receiving devices. The data path setup request and/or data setup response frames may include a device capability attribute including a CST parameter.

In one embodiment, the sending device may wait for an interval indicated in the CST parameter during which the receiving device may switch from a first channel to a second channel (or vice versa). The sending device may then send data to the receiving device over the current channel over which the receiving device is communicating.

Embodiments described herein may improve data communication between NAN devices by coordinating channel switch times and specifying a transmitting device's behavior to ensure that receiving devices are able to receive data traffic.

The above descriptions are for purposes of illustration and are not meant to be limiting. Numerous other examples, configurations, processes, etc., may exist, some of which are described in detail below. Example embodiments will now be described with reference to the accompanying figures.

Figure 1:
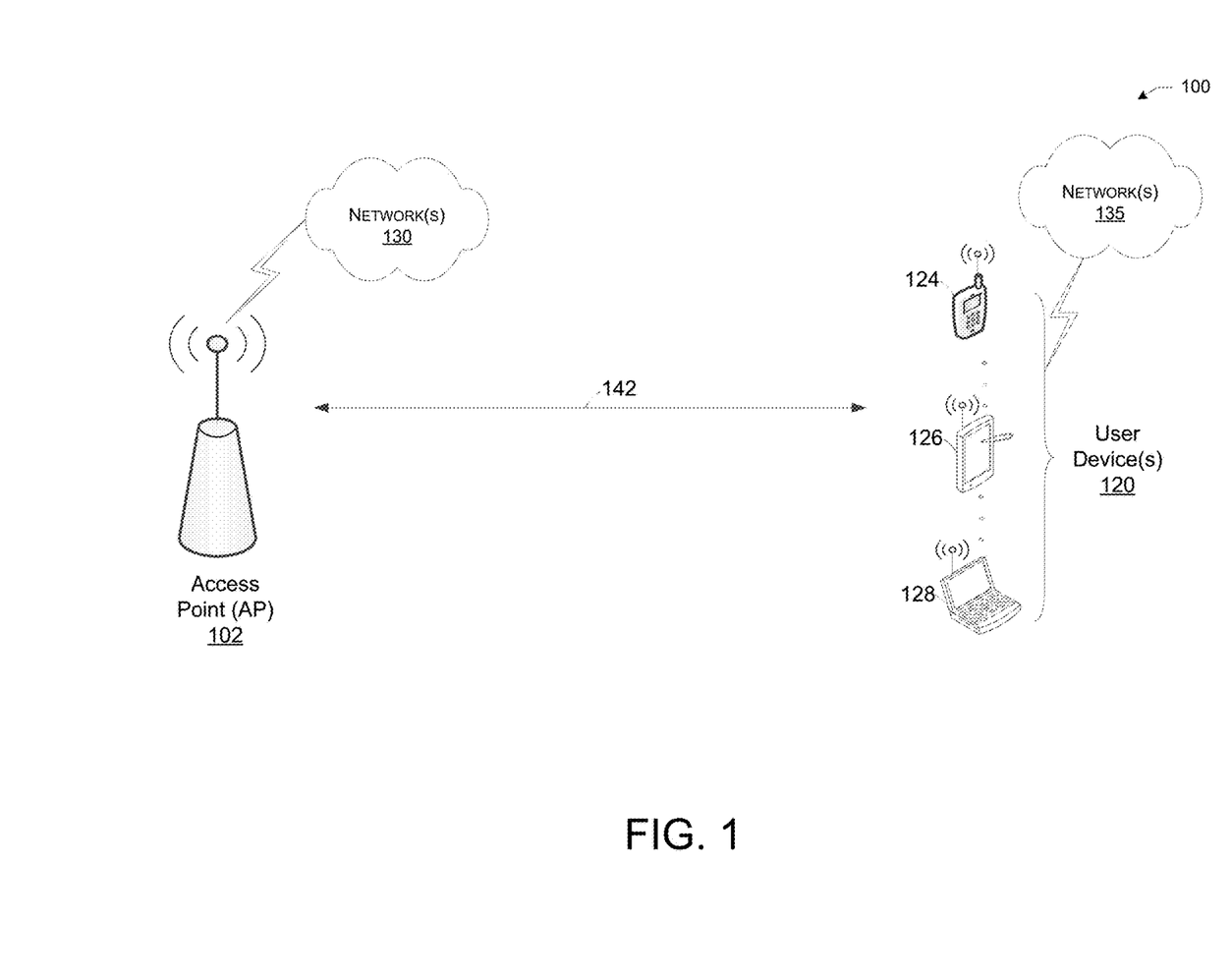
FIG. 1 shows an exemplary network environment in accordance with the systems and methods disclosed herein.

FIG. 1 is a network diagram illustrating an example network environment, according to some example embodiments of the present disclosure. Wireless network 100 may include one or more devices 120 and one or more access point(s) (AP) 102, which may communicate in accordance with IEEE 802.11 communication standards, including IEEE 802.11ax. The device(s) 120 may be mobile devices that are non-stationary and do not have fixed locations. The user device(s) 120 may be used by one or more user(s).

The user device(s) 120 (e.g., 124, 126, or 128) may include any suitable processor-driven user device including, but not limited to, a desktop user device, a laptop user device, a server, a router, a switch, an access point, a smartphone, a tablet, wearable wireless device (e.g., bracelet, watch, glasses, ring, etc.) and so forth. In some embodiments, the user devices 120 and AP 102 may include one or more computer systems similar to that of the functional diagram of FIG. 4 and/or the example machine/system of FIG. 5, to be discussed further.

Returning to FIG. 1, any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennae. Communications antenna may be any suitable type of antenna corresponding to the communications protocols used by the user device(s) 120 (e.g., user devices 124, 124 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 120.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Typically, when an AP (e.g., AP 102) establishes communication with one or more user devices 120 (e.g., user devices 124, 126, and/or 128), the AP may communicate in the downlink direction by sending data frames (e.g., 142). The data frames may be preceded by one or more preambles that may be part of one or more headers. These preambles may be used to allow the user device to detect a new incoming data frame from the AP. A preamble may be a signal used in network communications to synchronize transmission timing between two or more devices (e.g., between the APs and user devices).

In various network standards, for example, in IEEE 802.11mc D5.0, a channel switch time parameter may be specified and transmitted in a channel switch announcement frame by a device (alternatively referred to as a source (SRC) station (STA), or simply STA herein). However, a NAN device may not be able to send a channel switch announcement frame when switching channels. A NAN device may instead switch channels based on predetermined and/or negotiated channel/time slot schedules, for example, using availability windows. The disclosed herein are systems and methods that are directed to coordinating channel switch times and specifying device operation (for example, transmitting device operation) to ensure data reception by one or more devices (for example, receiving devices).

In NAN networks, NAN data paths may refer to services that allow NAN devices to setup a data connection between each other. During the NAN data path connection setup, the NAN devices may negotiate availability windows on one or more channels with peer NAN devices on which to communicate. The availability windows may indicate the channels and time slots for the data transmission. Moreover, the availability windows may occur on different channels at different times, that is, the availability windows may hop from channel to channel (for example, from a first channel (for example, channel a), to another channel (for example, channel b) in approximately adjacent time blocks.

Figure 2:
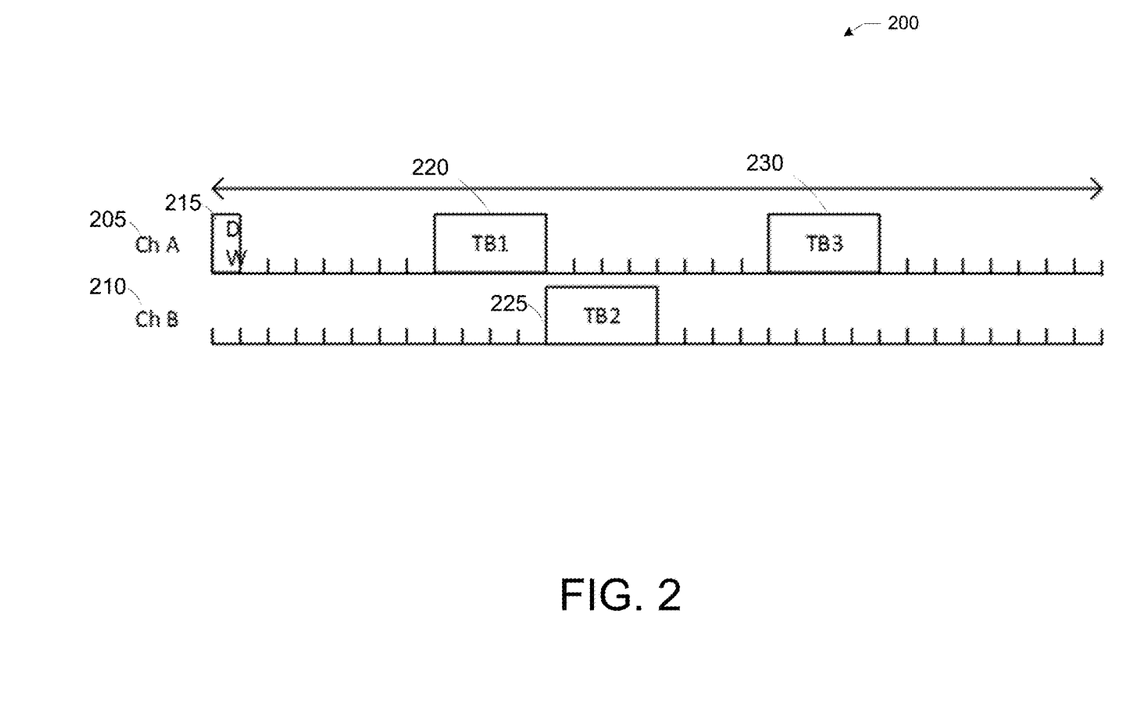
FIG. 2 shows an example of an availability window hop in accordance with example embodiments of the disclosure.

FIG. 2 shows an example diagram 200 of an availability window channel hop for devices communicating on two channels (channel A 205 and channel B 210). The availability window channel hop in this example may occur by a transmitting device (e.g., AP 102 and/or user devices 120 of FIG. 1) from a first time block (e.g., time block 1 (TB1) 220) operating on channel A 205 to a second time block (e.g., time block 2 (TB2) 225) operating on channel B 210. The diagram 200 further shows an availability window channel hop by the transmitting device from the second time block, time block 2 (TB2) 225 operating on channel B 205 to a third time block, time block 3 (TB3) 230 operating on channel B 205.

In one embodiment, a NAN device may communicate a channel switch time parameter associated with the NAN device, to other NAN devices (for example, other NAN devices in a NAN device cluster) before or during a NAN data path setup. In another embodiment, the channel switch time parameter may be included as a device capability parameter in a service discovery frame, and/or data path request/response frames.

In one embodiment, a larger value of the channel switch time parameter between the two NAN devices may be used for the channel switch time for unicast NAN data path connectivity, as compared with, for example, the value of the channel switch time parameter for multicast NAN data path connectivity. In another embodiment, for multicast NAN data path communication, the channel switch time parameter of the multicast transmitting device may be used for the value of the channel switch time parameter. Alternatively, the largest value of channel switch time among the multicast group devices may be used for the value of the channel switch time parameter for the multicast NAN data patch communication.

In various embodiments, the start time associated with the first transmission after a switch occurs by a device, as sent from the channel the device switched to may be based at least in part on the start time of the time block associated with the channel the device switched to, a channel switch time (CST), a NAN probe time (NPT), and a random backoff time (RBT). For example, the start time associated with the first transmission after a switch occurs by a device as sent from the channel the device switched to may be greater than or equal to the sum of the start time of the time block associated with the channel the device switched to, the CST, the NPT, and the RBT.

In various embodiments, for a starting time associated with a channel switch from a first channel (e.g., channel A 205) in a first time block (e.g., time block 1 220) to a different, contiguous (in time) channel (e.g., channel B 210) in a second time block (e.g., time block 2 225), a device may start the channel switch at the end of the first time block (e.g., time block 1 220). Alternatively, no further restrictions may be specified, but it may require that the NAN device needing to send a frame to inform other NAN devices (for example, other NAN devices in the cluster of NAN devices) that the device is not available for the rest of the first time block (for example, time block 1 220) while the NAN device is switching channels, for example, before the end of the first time block.

In one embodiment, a channel switch time may be added to a device capability attribute. The device capability attribute may be transmitted by the device to other devices (for example, other NAN devices in a NAN device cluster) in a service discovery frame and/or data path setup request/response frames. Furthermore, the channel switch time field may have a variable value corresponding to the time it takes for the NAN device to switch channels in units of microseconds, and the channel switch time field may have a predetermined size, for example, a predetermined size of 2 octets.

Figure 3:
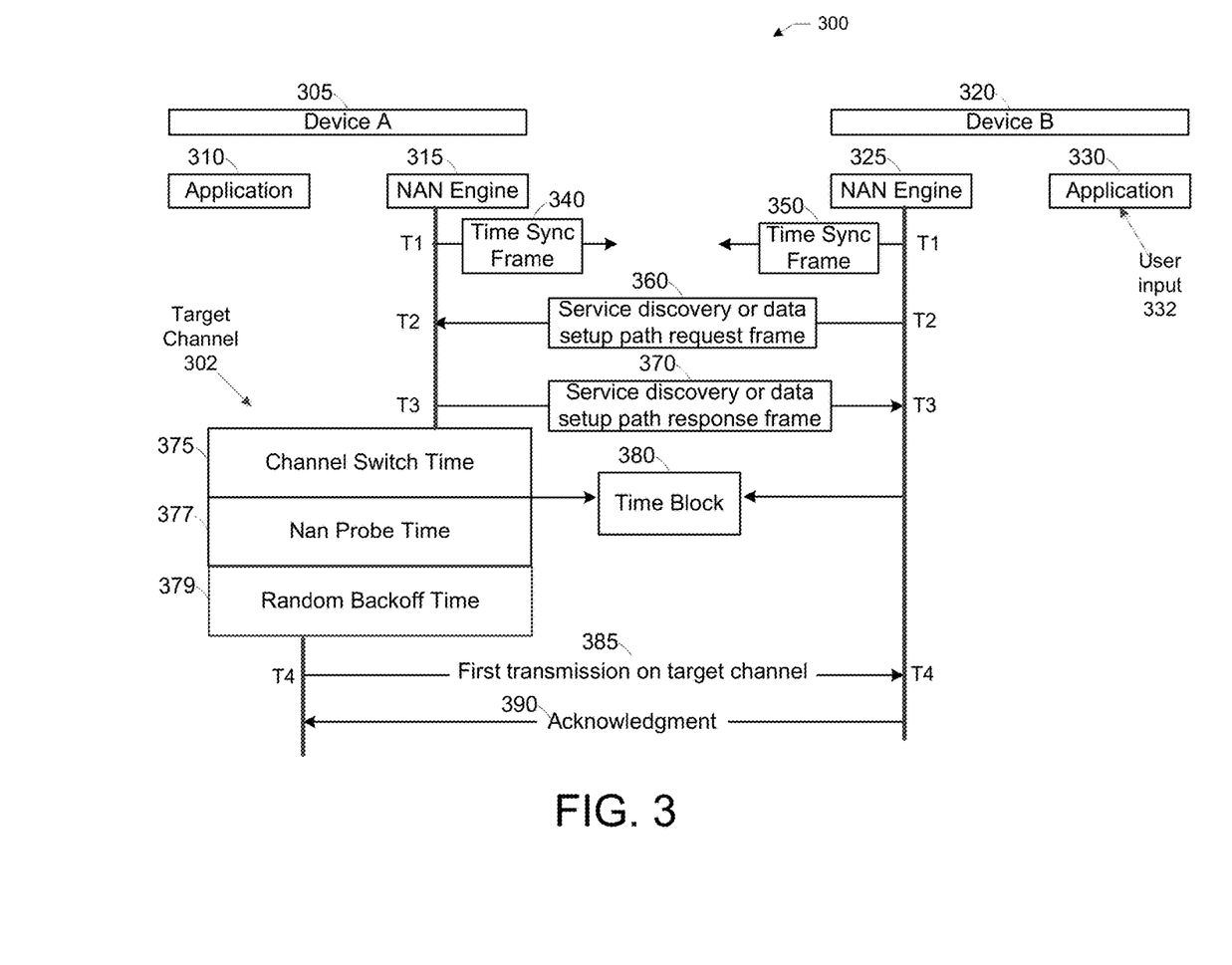
FIG. 3 shows a diagram of an example operation of the disclosed systems and methods in accordance with example embodiments of the disclosure.

FIG. 3 shows a diagram 300 representing an example device operation (e.g., a NAN device operation) during a channel switch in accordance with example embodiments of the disclosure. As shown in the diagram 300, two devices, device A 305 and device B 320 may communicate on a network, for example, a NAN network. The device A 305 may further comprise an application module 310 which may run various programs related to the communication on the network. The device B 320 may further comprise an application module 330 which may also run various programs related to communication on the network, receive input 332 from one or more users, and the like. The device A 305 and the device B 320 may further comprise a NAN engine 315 and a NAN engine 325, respectively, that may engage in communication with each other as well as one or more other NAN devices, for example, NAN devices that are part of a NAN cluster (not shown).

At a first scheduled time (T1), the device A 305 and the device B 320 may send various time synchronization frames (e.g., time synchronization frames 340 and 350) to one another, for example, to synchronize communications on the NAN network. At a next scheduled time (T2), device B 320 may send a service discovery and/or a data path setup request frame 360 along with a device capability attribute (e.g., CST-A) to the device A 305. At a next scheduled time, the device A 305 may send a service discovery and/or data path setup response frame 370 along with a device capability attribute (e.g., call CST-B) to device B 320. CST-A may refer to device A's channel switch time, and CST-B may refer to device B's channel switch time.

At this point the devices A 305 and B 320 may be communicating on a first channel (not shown). At a predetermined scheduled time block 380, the devices A 305 and B 320 may switch channels to the target channel 302. Upon arriving in the target channel 302, the device A 305 may wait at least for a duration specified by a channel switch time (CST) parameter 375. The CST parameter 375 may be determined as the maximum value of the first CST, CST-A and the second CST, CST-B.

After switching channels, each NAN device (device A 305 and device B 320) may perform a clear channel assessment (CCA) on the target channel 302 (not shown). This may result in a frame being detected by one of the devices (device A 305 and device B 320), in which case the device may set a network allocation vector (NAV) associated with the device. Alternatively, the devices (device A 305 and device B 320) may wait until a period of time equal to at least a NAN probe time (NPT) 377 has transpired before transmitting and/or receiving any data.

The first transmission 385 on the target channel 302 may be preceded by a random backoff (RBT) 379, which may start approximately at the end of the NAN probe time (NPT) 377 parameter, and followed by an acknowledgement message 390 from the NAN engine 325 in the device B 320.

At a next scheduled time T4, the devices A 305 and B 320 may begin transmitting and/or receiving data with each other. In various embodiments, the start time associated with a first transmission 385 by the device A 305 sent on the target channel 302 the device B 320 switch may be based at least in part on a start time of the time block associated with the channel the transmitting device switched to, the channel switch time (CST), the NAN probe time (NPT), and the random backoff time (RBT). For example, the start time (T4) associated with the first transmission by the device A 305 sent from the channel the device B 320 switched to may be greater than or equal to the sum of the start time of the time block 380 associated with the channel the device A 305 switched to, the CST 375, the NPT 377, and the RBT 379.

In various embodiments, for a starting time associated with a channel switch from a first channel (e.g., channel A 205 of FIG. 2) in a first time block (e.g., time block 1 220 of FIG. 2) to a different, approximately contiguous (in time) channel (e.g., channel B 210 of FIG. 2) in a second time block (e.g., time block 2 225 of FIG. 2), the systems and methods may further define that a device starts the channel switch at the end of the first time block (e.g., time block 1

220 of FIG. 2). Alternatively, the systems and methods may not specify any further restriction, but may require that the NAN device needs to send a frame to inform other NAN devices (for example, other NAN devices in the cluster of NAN devices) that the device is not available for the rest of the first time block (for example, time block 1 220 of FIG. 2) while the NAN device is switching channels, for example, before the end of the first time block.

Figure 4A:
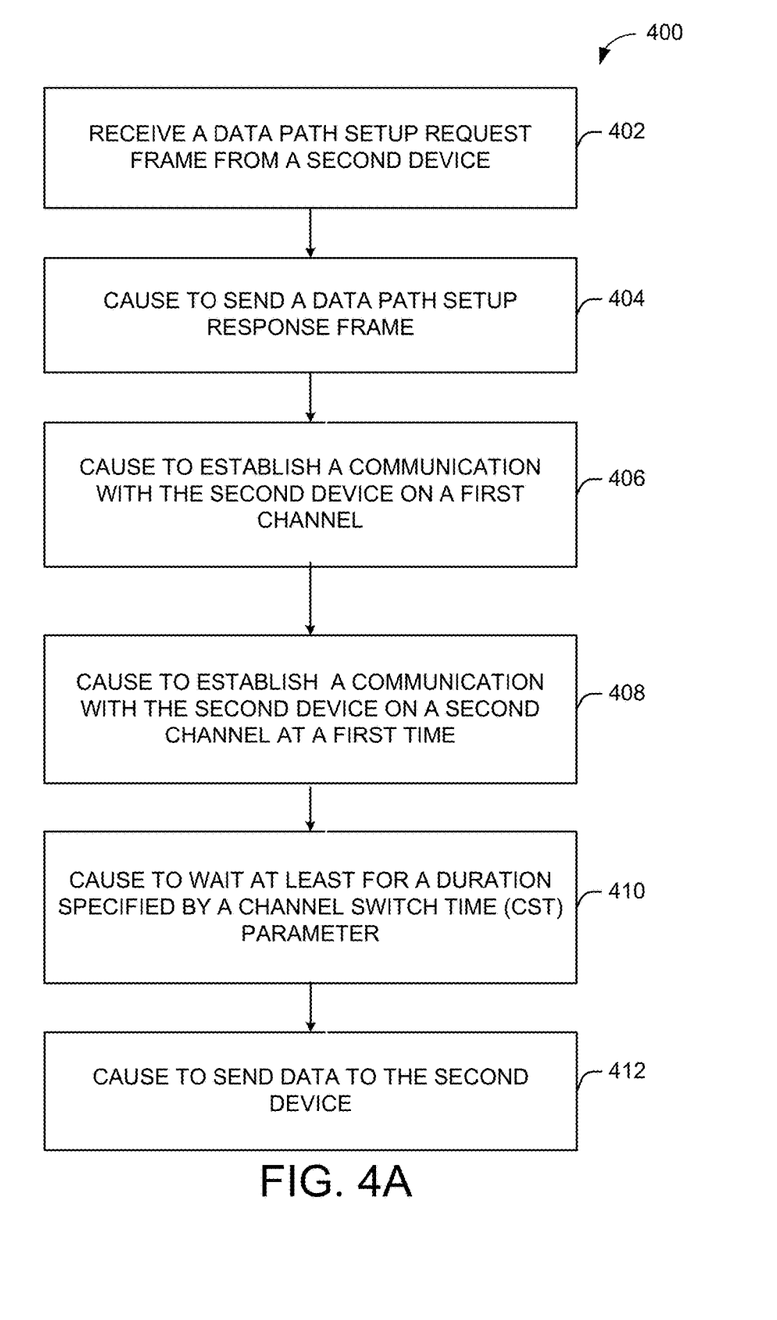
FIG. 4A shows a flow diagram of an illustrative process for coordinating channel switch times and specifying device operation, in accordance with one or more embodiments of the disclosure.

FIG. 4A illustrates a flow diagram of an illustrative process 400 for coordinating channel switch times and specifying device operation, in accordance with one or more embodiments of the disclosure.

At block 402, a device (e.g., the AP 102 or the user device 120 of FIG. 1), may receive a data path setup request frame from a second device (e.g., the AP 102 or the user device 120). In one embodiment, the data path setup request frame may include a device capability attribute.

At block 404, the device may cause to send a data path setup response frame to the second device. In one embodiment, the data path setup request frame may include a second device capability attribute.

At block 406, the device may cause to establish a communication with the second device on a first channel. For example, the device may establish communication with the second device over a 2.4 GHz channel, a 5 GHz channel, or a 60 GHZ channel.

At block 408, the device may cause to establish a communication with the second device on a second channel at a first time. In one embodiment, the device may use an availability window to establish the communication with the second device. For example, the device may use an availability window to switch channels based on predetermined and/or negotiated channel/time slot schedules.

At block 410, the device may cause to wait at least for a duration specified by a channel switch time (CST) parameter. The CST parameter may include a device capability parameter associated with the data path setup request frame or a second device capability parameter associated with the data setup response frame. In one embodiment, the CST parameter may be determined as a maximum value of the first device capability attribute and the second device capability attribute discussed above with respect to blocks 402 and 404 as well as in FIGS. 2-3. In one embodiment, the device may also cause to wait for a duration specified by a NPT. In another embodiment, the device may cause to wait for a duration specified by a RBT.

At block 412, the device may cause to send data to the second device over the first channel or the second channel based at least in part on the CST parameter. It is understood that the above descriptions are for purposes of illustration and are not meant to be limiting.

Figure 4B:
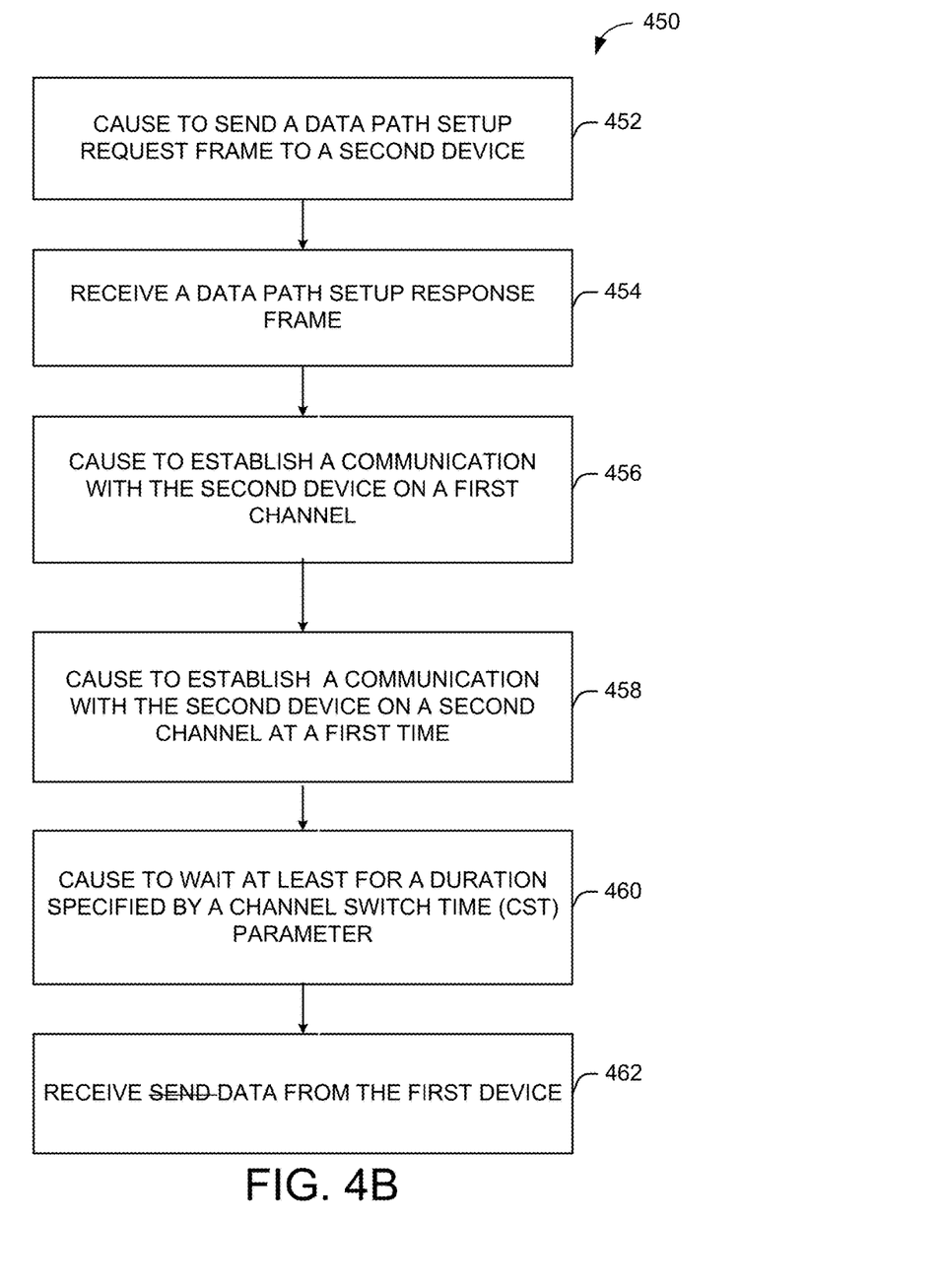
FIG. 4B shows a flow diagram of an illustrative process for coordinating channel switch times and specifying device operation, in accordance with one or more embodiments of the disclosure.

FIG. 4B illustrates a flow diagram of an illustrative process 450 for coordinating channel switch times and specifying device operation, in accordance with one or more embodiments of the disclosure.

At block 452, a device (e.g., the AP 102 or the user device 120 of FIG. 1), may cause to send a data path setup request frame to a second device. In one embodiment, the data path setup request frame may include a device capability attribute.

At block 454, the device may receive a data path setup response frame. In one embodiment, the data path setup request frame may include a second device capability attribute.

At block 456, the device may cause to establish a communication with the second device on a first channel. For example, the device may establish communication with the second device over a 2.4 GHz channel, a 5 GHz channel, or a 60 GHZ channel.

At block 458, the device may cause to establish a communication with the second device on a second channel at a first time. In one embodiment, the device may use an availability window to establish the communication with the second device.

At block 460, the device may cause to wait at least for a duration specified by a channel switch time (CST) parameter. The CST parameter may include a device capability parameter associated with the data path setup request frame or a second device capability parameter associated with the data setup response frame. In one embodiment, the CST parameter may be determined as a maximum value of the first device capability attribute and the second device capability attribute discussed above. In one embodiment, the device may also cause to wait for a duration specified by a NPT. In another embodiment, the device may cause to wait for a duration specified by a RBT.

At block 462, the device may cause to receive data from the first device over the first channel or the second channel based at least in part on the CST parameter. It is understood that the above descriptions are for purposes of illustration and are not meant to be limiting.

Figure 5:
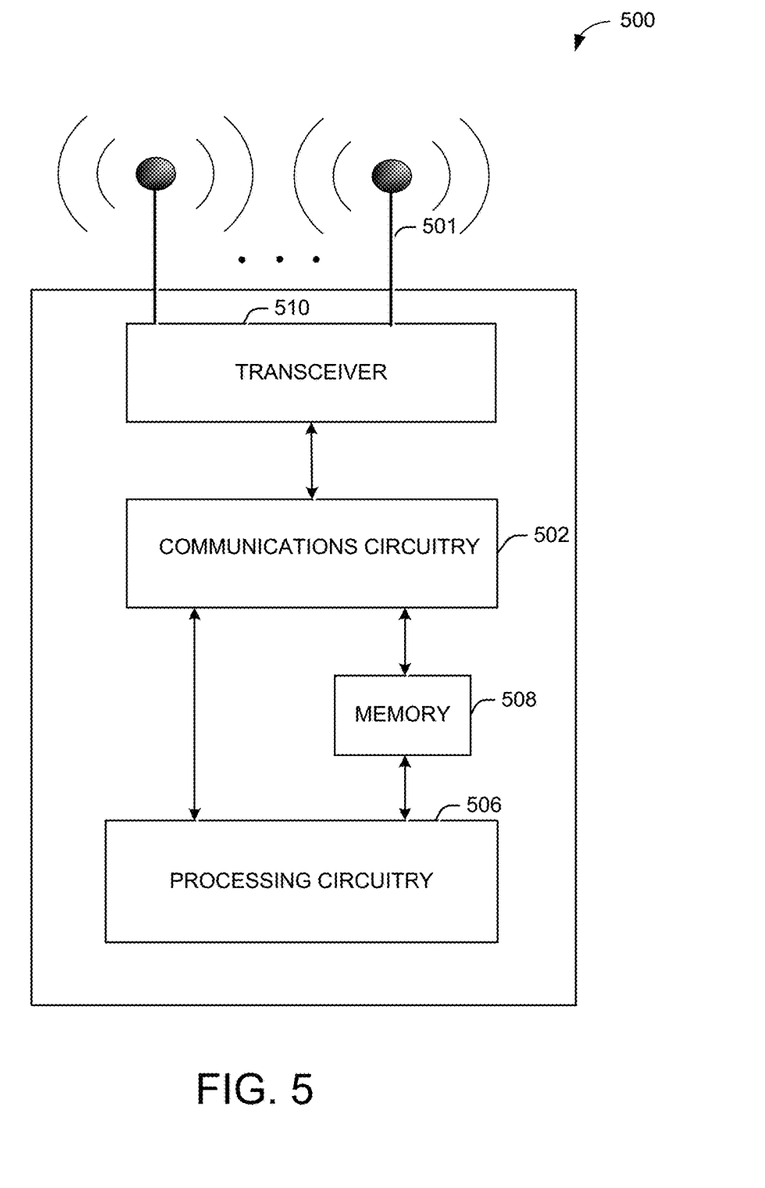
FIG. 5 illustrates a functional diagram of an example communication station that may be suitable for use as a user device, in accordance with one or more example embodiments of the disclosure.

FIG. 5 shows a functional diagram of an exemplary communication station 500 in accordance with some embodiments. In one embodiment, FIG. 5 illustrates a functional block diagram of a communication station that may be suitable for use as an AP 102 (FIG. 1) or communication station user device 120 (FIG. 1) in accordance with some embodiments. The communication station 500 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that may operate the physical layer communications and/or medium access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in FIGS. 1-3, 4A, and 4B.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

Figure 6:
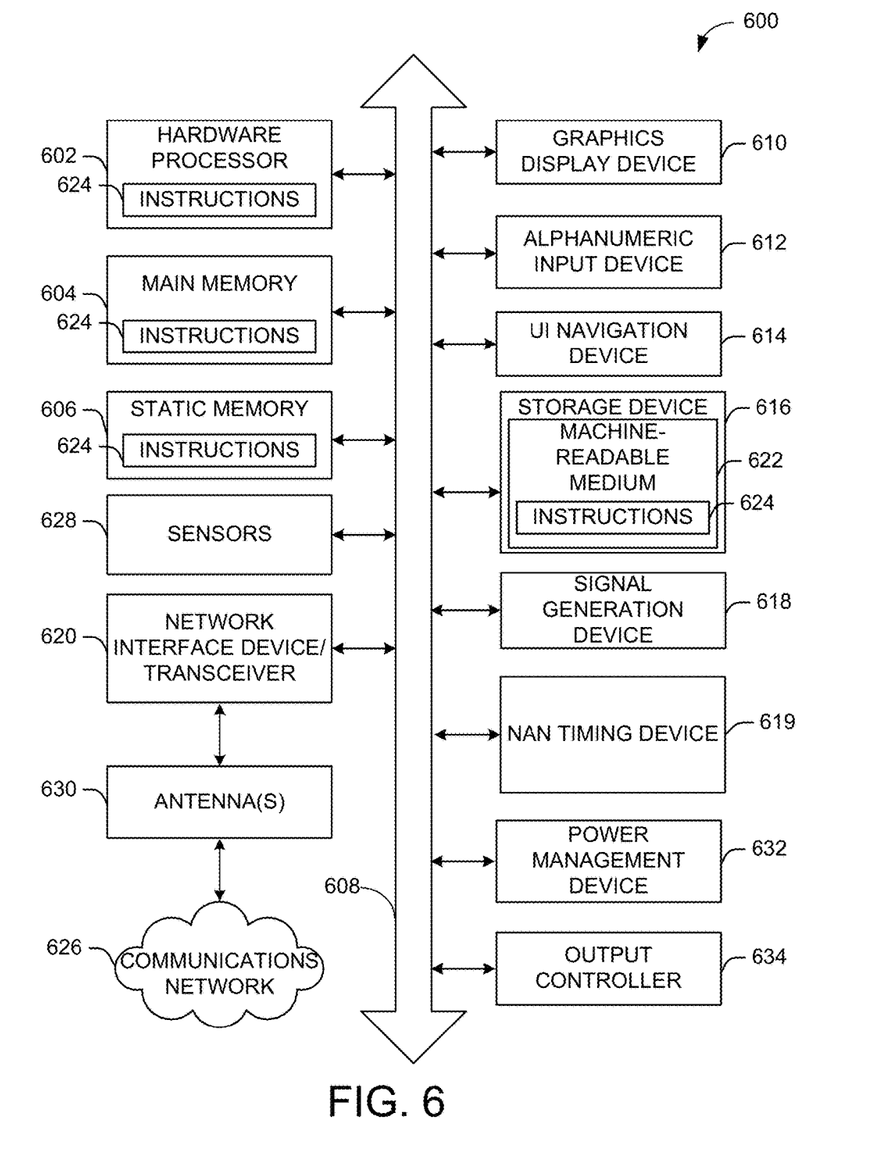
FIG. 6 shows a block diagram of an example machine upon which any of one or more techniques (e.g., methods) may be performed, in accordance with one or more embodiments of the disclosure.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), a NAN timing device 619, a network interface device/transceiver 620 coupled to antenna(s) 630, and one or more sensors 628, such as a global positioning system (GPS) sensor, compass, accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The NAN timing device 619 may carry out or perform any of the operations and processes (e.g., processes 400 and 450) described and shown above. For example, the NAN timing device 619 may be configured to coordinate channel switch times and specify device operation (for example, transmitting device operation) to ensure data reception by one or more devices (for example, receiving devices).

In one embodiment, the NAN device 619 may be configured to introduce a new attribute (e.g., a channel switch time device capability attribute) to define the timing of channel switch times. The attribute may include a channel switch time (CST) parameter that indicates an interval (e.g., in microseconds) that a device takes to switch from one channel to another channel.

In one embodiment, the NAN device 619 may be configured to transmit the attribute when it is performing a service discovery to discover one or more services that may be offered by a receiving device.

In another embodiment, the NAN device 619 may be configured to transmit the attribute in a data path setup request and/or data setup response frame that may be communicated between the sending and one or more NAN receiving devices. The data path setup request and/or data setup response frames may include a device capability attribute including a CST parameter.

In one embodiment, the NAN device 619 may be configured to wait for an interval indicated in the CST parameter during which the receiving device may switch from a first channel to a second channel (or vice versa). The NAN device 619 may be configured to send data to the receiving device over the current channel over which the receiving device is communicating.

Embodiments described herein may improve data communication between NAN devices by coordinating channel switch times and specifying a transmitting device's behavior to ensure that receiving devices are able to receive data traffic.

It is understood that the above are only a subset of what the NAN timing device 619 may be configured to perform and that other functions included throughout this disclosure may also be performed by the NAN timing device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, (e.g., a Smartphone), a Wireless Application Protocol (WAP) device, or the like.

Some embodiments may be used in conjunction with one or more types of wireless communication signals and/or systems following one or more wireless communication protocols, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

According to example embodiments of the disclosure, there may be a device. The device may include memory and processing circuitry configured to receive a data path setup request frame from a second device. The memory and processing circuitry may be further configured to cause to send a data path setup response frame. The memory and processing circuitry may be further configured to cause to establish a communication with the second device on a first channel. The memory and processing circuitry may be further configured to cause to establish a communication with the second device on a second channel at a first time. The memory and processing circuitry may be further configured to cause to wait at least for a duration specified by a channel switch time (CST) parameter. The memory and processing circuitry may be further configured to cause to send data to the second device over the first channel or the second channel based at least in part on the CST parameter.

The implementations may include one or more of the following features. An availability may be used to establish a communication with the second device on a second channel at a first time. The data path setup request frame may include a first device capability attribute. The first device capability attribute may include the CST parameter. The data path setup response frame may further include a second device capability attribute. The second device capability attribute may include the CST parameter. The memory and processing circuitry may further be configured to determine the CST parameter as a maximum value of the first device capability attribute and the second device capability attribute. The memory and processing circuitry may further be configured to cause the device to wait for a duration specified by a Neighborhood Awareness Network (NAN) probe time (NPT) before the causing to send, by the device, data to the second device. The memory and processing circuitry may further be configured to cause the device to wait for a duration specified by a random backoff time (RBT) before the causing to send data to the second device. The channel switch time (CST) parameter may further include a device capability parameter associated with a data path setup request frame or a second device capability parameter associated with a data path setup response frame. The device may further include a transceiver configured to transmit and receive wireless signals and an antenna coupled to the transceiver.

According to example embodiments of the disclosure, there may be a device. The device may include memory and processing circuitry configured to cause to send, by a first device, a data path setup request frame to a second device. The memory and processing circuitry may further be configured to receive a data path setup response frame. The memory and processing circuitry may further be configured to cause to establish, by the first device, a communication with the second device on a first channel. The memory and processing circuitry may further be configured to cause to establish, by the first device, a communication with the second device on a second channel at a first time. The memory and processing circuitry may further be configured to cause to wait, by the first device, at least for a duration specified by a channel switch time (CST) parameter. The memory and processing circuitry may further be configured to receive data from the first device over the first channel or the second channel based at least in part on the CST parameter.

The implementations may include one or more of the following features. The data path setup request frame may include a first device capability attribute. The data path setup response frame may include a second device capability attribute. The channel switch time (CST) parameter may be a maximum value of the first device capability attribute and the second device capability attribute. The memory and processing circuitry may further be configured to cause the first device to wait for a duration specified by a Neighborhood Awareness Network (NAN) probe time (NPT) before the data is received. The memory and processing circuitry may further be configured to cause the first device to wait for a duration specified by a random backoff time (RBT) before the data is received. The channel switch time (CST) parameter may further include a first device capability parameter associated with a data path setup request frame or a second device capability parameter associated with a data path setup response frame. The device may further include a transceiver configured to transmit and receive wireless signals and an antenna coupled to the transceiver.

According to example embodiments of the disclosure, there may be a non-transitory computer-readable medium storing computer-executable instructions which, when executed by a processor, cause the processor to perform operations. The operations may include receiving a data path setup request frame from a second device. The operations may further include causing to send a data path setup response frame. The operations may further include causing to establish a communication with the second device on a first channel. The operations may further include causing to establish a communication with the second device on a second channel at a first time. The operations may further include causing to wait at least for a duration specified by a channel switch time (CST) parameter. The operations may further include causing to send data to the second device over the first channel or the second channel based at least in part on the CST parameter.

The implementations may include one or more of the following features. An availability may be used to establish a communication with the second device on a second channel at a first time. The data path setup request frame may include a first device capability attribute. The first device capability attribute may include the CST parameter. The data path setup response frame may further include a second device capability attribute. The second device capability attribute may include the CST parameter. The operations may further include determining the CST parameter as a maximum value of the first device capability attribute and the second device capability attribute. The operations may further include causing the device to wait for a duration specified by a Neighborhood Awareness Network (NAN) probe time (NPT) before the causing to send, by the device, data to the second device. The operations may further include waiting for a duration specified by a random backoff time (RBT) before the causing to send data to the second device. The channel switch time (CST) parameter may further include a device capability parameter associated with a data path setup request frame or a second device capability parameter associated with a data path setup response frame.

According to example embodiments of the disclosure, there may be a non-transitory computer-readable medium storing computer-executable instructions which, when executed by a processor, cause the processor to perform operations. The operations may include causing to send, by a first device, a data path setup request frame to a second device. The operations may further include receiving a data path setup response frame. The operations may further include causing to establish, by the first device, a communication with the second device on a first channel. The operations may further include causing to establish, by the first device, a communication with the second device on a second channel at a first time. The operations may further include causing to wait, by the first device, at least for a duration specified by a channel switch time (CST) parameter. The operations may further include receiving data from the first device over the first channel or the second channel based at least in part on the CST parameter.

The implementations may include one or more of the following features. The data path setup request frame may include a first device capability attribute. The data path setup response frame may include a second device capability attribute. The channel switch time (CST) parameter may be a maximum value of the first device capability attribute and the second device capability attribute. The operations may further include causing the first device to wait for a duration specified by a Neighborhood Awareness Network (NAN) probe time (NPT) before the data is received. The operations may further include causing the first device to wait for a duration specified by a random backoff time (RBT) before the data is received. The channel switch time (CST) parameter may further include a first device capability parameter associated with a data path setup request frame or a second device capability parameter associated with a data path setup response frame.

According to example embodiments of the disclosure, there may include a method. The method may include receiving, by a first device, a data path setup request frame from a second device. The method may further include causing to send a data path setup response frame. The method may further include causing to establish, by the first device, a communication with the second device on a first channel. The method may further include causing to establish, by the first device, a communication with the second device on a second channel at a first time. The method may further include causing to wait, by the first device, at least for a duration specified by a channel switch time (CST) parameter. The method may further include causing to send, by the first device, data to the second device over the first channel or the second channel based at least in part on the CST parameter.

The implementations may include one or more of the following features. The data path setup request frame may further include a first device capability attribute, the first device capability attribute including the CST parameter. The data path setup response frame may further include a second device capability attribute, the second device capability attribute including the CST parameter. The method may further include determining the CST parameter as a maximum value of the first device capability attribute and the second device capability attribute.

According to example embodiments of the disclosure, there may include a method. The method may include causing to send, by a first device, a data path setup request frame to a second device. The method may further include receiving a data path setup response frame. The method may further include causing to establish, by the first device, a communication with the second device on a first channel. The method may further include causing to establish, by the first device, a communication with the second device on a second channel at a first time. The method may further include causing to wait, by the first device, at least for a duration specified by a channel switch time (CST) parameter. The method may further include receiving data from the first device over the first channel or the second channel based at least in part on the CST parameter.

The implementations may include one or more of the following features. The data path setup request frame may include a first device capability attribute. The data path setup response frame may include a second device capability attribute. The channel switch time (CST) parameter may be a maximum value of the first device capability attribute and the second device capability attribute. The method may further include causing the first device to wait for a duration specified by a Neighborhood Awareness Network (NAN) probe time (NPT) probe time (NPT) before the data is received. The method may further include causing the first device to wait for a duration specified by a random backoff time (RBT) before the data is received. The channel switch time (CST) parameter may further include a first device capability parameter associated with a data path setup request frame or a second device capability parameter associated with a data path setup response frame.

In example embodiments of the disclosure, there may be an apparatus. The apparatus may include means for receiving, by a first device, a data path setup request frame from a second device. The apparatus may include means for causing to send a data path setup response frame. The apparatus may include means for causing to establish, by the first device, a communication with the second device on a first channel. The apparatus may include means for causing to establish, by the first device, a communication with the second device on a second channel at a first time. The apparatus may include means for causing to wait, by the first device, at least for a duration specified by a channel switch time (CST) parameter. The apparatus may include means for causing to send, by the first device, data to the second device over the first channel or the second channel based at least in part on the CST parameter.

The implementations may include one or more of the following features. The data path setup request frame may further include a first device capability attribute, the first device capability attribute including the CST parameter. The data path setup response frame may further include a second device capability attribute, the second device capability attribute including the CST parameter. The apparatus may include means for determining the CST parameter as a maximum value of the first device capability attribute and the second device capability attribute.

In example embodiments of the disclosure, there may be an apparatus. The apparatus may include means for causing to send, by a first device, a data path setup request frame to a second device. The apparatus may include means for receiving a data path setup response frame. The apparatus may include means for causing to establish, by the first device, a communication with the second device on a first channel. The apparatus may include means for causing to establish, by the first device, a communication with the second device on a second channel at a first time. The apparatus may include means for causing to wait, by the first device, at least for a duration specified by a channel switch time (CST) parameter. The apparatus may include means for receiving data from the first device over the first channel or the second channel based at least in part on the CST parameter.

The implementations may include one or more of the following features. The data path setup request frame may include a first device capability attribute. The data path setup response frame may include a second device capability attribute. The channel switch time (CST) parameter may be a maximum value of the first device capability attribute and the second device capability attribute. The apparatus may include means for causing the first device to wait for a duration specified by a Neighborhood Awareness Network (NAN) probe time (NPT) probe time (NPT) before the data is received. The apparatus may include means for causing the first device to wait for a duration specified by a random backoff time (RBT) before the data is received. The channel switch time (CST) parameter may further include a first device capability parameter associated with a data path setup request frame or a second device capability parameter associated with a data path setup response frame.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising a memory and processing circuitry configured to:
   receive a data path setup request frame from a second device, wherein the data path setup request frame comprises a first device capability attribute that includes a channel switch time (CST) parameter;
   cause to send a data path setup response frame, wherein the data path setup response frame comprises a second device capability attribute that includes the CST parameter;
   cause to establish a first communication with the second device on a first channel;
   cause to establish a second communication with the second device on a second channel at a first time;
   cause to wait at least for a duration specified by the CST parameter; and
   cause to send data to the second device over the first channel or the second channel based at least in part on the CST parameter.

2. The device of claim 1, wherein the memory and processing circuitry that cause to establish a communication with the second device on a second channel at a first time further comprise using at least an availability window.

3. The device of claim 1, wherein the memory and processing circuitry further comprise instructions to determine the CST parameter as a maximum value of the first device capability attribute and the second device capability attribute.

4. The device of claim 1, wherein the memory and processing circuitry further comprise instructions to cause the device to wait for a duration specified by a Neighborhood Awareness Network (NAN) probe time (NPT) before the causing to send, by the device, data to the second device.

5. The device of claim 1, wherein the memory and processing circuitry further comprise instructions to cause the device to wait for a duration specified by a random backoff time (RBT) before the causing to send data to the second device.

6. The device of claim 1, wherein the CST parameter further comprises a device capability parameter associated with a data path setup request frame or a second device capability parameter associated with a data path setup response frame.

7. The device of claim 1, further comprising a transceiver configured to transmit and receive wireless signals and an antenna coupled to the transceiver.

8. A non-transitory computer-readable medium storing computer-executable instructions which, when executed by one or more processors result in performing operations comprising:
   causing to send, by a first device, a data path setup request frame to a second device, wherein the data path setup request frame comprises a first device capability attribute that includes a channel switch time (CST) parameter;
   receiving a data path setup response frame, wherein the data path setup response frame comprises a second device capability attribute that includes the channel switch time (CST) parameter;
   causing to establish, by the first device, a first communication with the second device on a first channel;
   causing to establish, by the first device, a second communication with the second device on a second channel at a first time;
   causing to wait, by the first device, at least for a duration specified by the CST parameter; and
   receiving data from the first device over the first channel or the second channel based at least in part on the CST parameter.

9. The non-transitory computer-readable medium of claim 8, wherein the CST parameter is a maximum value of the first device capability attribute and the second device capability attribute.

10. The non-transitory computer-readable medium of claim 8, wherein the computer-executable instructions further comprise instructions causing the first device to wait for a duration specified by a Neighborhood Awareness Network (NAN) probe time (NPT) before the data is received.

11. The non-transitory computer-readable medium of claim 8, wherein the computer-executable instructions further comprise instructions causing the first device to wait for a duration specified by a random backoff time (RBT) before the data is received.

12. The non-transitory computer-readable medium of claim 8, wherein the CST parameter further comprises a first device capability parameter associated with a data path setup request frame or a second device capability parameter associated with a data path setup response frame.

13. A method comprising:
receiving, by a first device, a data path setup request frame from a second device wherein the data path setup request frame comprises a first device capability attribute that includes a channel switch time (CST);
causing to send a data path setup response frame, wherein the data path setup response frame comprises a second device capability attribute that includes the CST parameter;
causing to establish, by the first device, a first communication with the second device on a first channel;
causing to establish, by the first device, a second communication with the second device on a second channel at a first time;
causing to wait, by the first device, at least for a duration specified by the CST parameter; and
causing to send, by the first device, data to the second device over the first channel or the second channel based at least in part on the CST parameter.

14. The method of claim 13, further comprising determining the CST parameter as a maximum value of the first device capability attribute and the second device capability attribute.

* * * * *